United States Patent
Morita et al.

(10) Patent No.: US 11,658,534 B2
(45) Date of Patent: May 23, 2023

(54) COIL SUBSTRATE, MOTOR COIL SUBSTRATE, AND MOTOR

(71) Applicant: IBIDEN CO., LTD., Gifu (JP)

(72) Inventors: Haruhiko Morita, Ogaki (JP); Hitoshi Miwa, Ogaki (JP); Shinobu Kato, Ogaki (JP); Toshihiko Yokomaku, Ogaki (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 0 days.

(21) Appl. No.: 17/450,856

(22) Filed: Oct. 14, 2021

(65) Prior Publication Data

US 2022/0123616 A1 Apr. 21, 2022

(30) Foreign Application Priority Data

Oct. 16, 2020 (JP) .............................. JP2020-174710

(51) Int. Cl.
*H02K 3/26* (2006.01)

(52) U.S. Cl.
CPC .......... *H02K 3/26* (2013.01); *H02K 2203/03* (2013.01)

(58) Field of Classification Search
CPC .... H02K 3/00; H02K 3/26; H01F 5/00; H01F 5/003; H01F 17/00; H01F 17/006; H01F 27/00; H01F 27/28; H01L 23/00; H01L 23/52; H01L 23/522
See application file for complete search history.

(56) References Cited

U.S. PATENT DOCUMENTS

| 4,665,331 A | * | 5/1987 | Sudo | H02K 3/26 |
| | | | | 310/40 MM |
| 2003/0098496 A1 | * | 5/2003 | Sugiyama | H01L 27/08 |
| | | | | 257/516 |
| 2009/0084975 A1 | * | 4/2009 | Zach | H01J 37/26 |
| | | | | 250/396 ML |

FOREIGN PATENT DOCUMENTS

| JP | 2018198277 | * | 12/2018 | ............... H02K 3/26 |
| JP | 2020-038865 A | | 3/2020 | |
| JP | 2020089207 | * | 6/2020 | ............... H02K 3/26 |

* cited by examiner

*Primary Examiner* — Tran N Nguyen
(74) *Attorney, Agent, or Firm* — Oblon, McClelland, Maier & Neustadt, L.L.P.

(57) ABSTRACT

A coil substrate includes a flexible substrate having first and second ends, a first coil formed on first surface of the substrate such that the first coil has center space and first wiring surrounding the space, and an second coil formed on second surface of the substrate such that the second coil has center space and second wiring surrounding the space and is positioned directly below the first coil. Each of the first and second wirings has outer and inner ends such that each wiring is formed in spiral shape between the outer and inner ends, a number of turns in the first coil is greater than a number of turns in the second coil, a width of the first wiring is substantially constant from the outer end to the inner end, and a width of the second wiring is not constant from the outer end to the inner end.

20 Claims, 3 Drawing Sheets

COIL SUBSTRATE, MOTOR COIL SUBSTRATE, AND MOTOR

CROSS-REFERENCE TO RELATED APPLICATIONS

The present application is based upon and claims the benefit of priority to Japanese Patent Application No. 2020-174710, filed Oct. 16, 2020, the entire contents of which are incorporated herein by reference.

BACKGROUND OF THE INVENTION

Field of the Invention

The present invention relates to a coil substrate, a motor coil substrate, and a motor.

Description of Background Art

Japanese Patent Application Laid-Open Publication No. 2020-38865 describes a motor coil substrate and a method for manufacturing the motor coil substrate. The entire contents of this publication are incorporated herein by reference.

SUMMARY OF THE INVENTION

According to one aspect of the present invention, a coil substrate includes a flexible substrate having a first end and a second end on the opposite side with respect to the first end, a first coil formed on a first surface of the flexible substrate such that the first coil has a center space and a first wiring surrounding the center space, and an second coil formed on a second surface of the flexible substrate on the opposite side with respect to the first surface such that the second coil has a center space and a second wiring surrounding the center space and is positioned directly below the first coil. Each of the first and second wirings of the first and second coils has an outer end and an inner end such that each of the first and second wirings is formed in a spiral shape between the outer end and the inner end, the first coil is formed such that a number of turns in the first coil is greater than a number of turns in the second coil and that a width of the first wiring forming the first coil is substantially constant from the outer end to the inner end, and the second coil is formed such that a width of the second wiring forming the second coil is not constant from the outer end to the inner end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 2A:
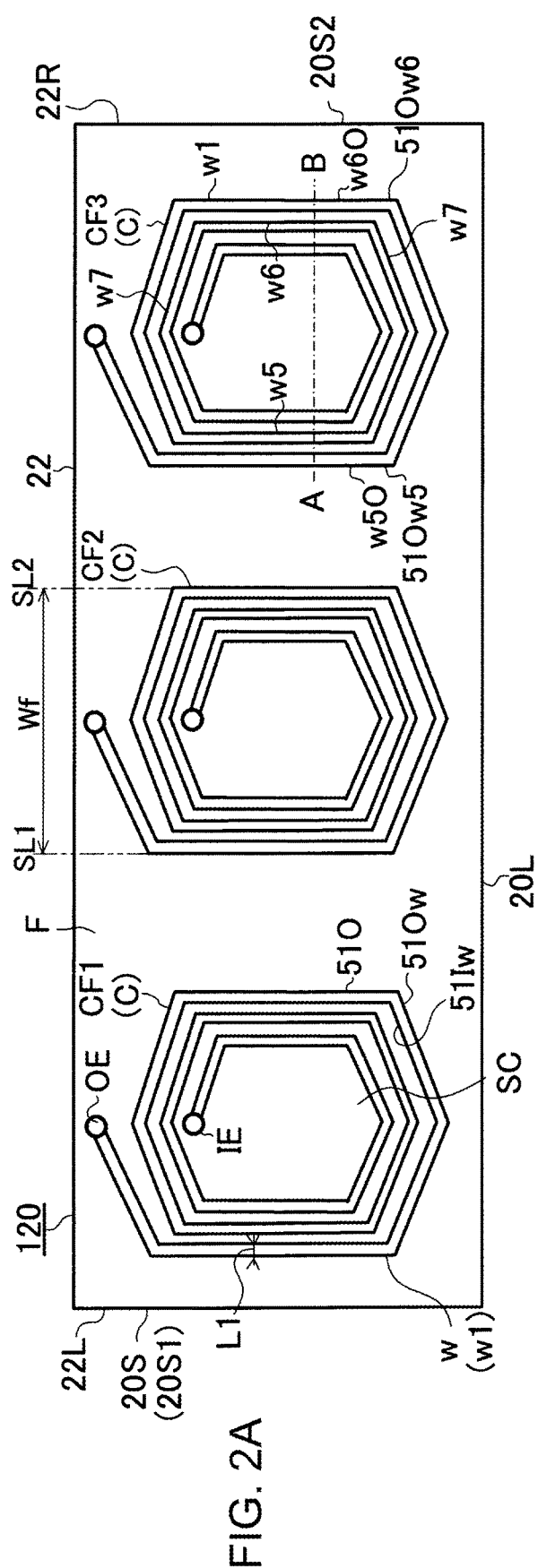
FIG. 2A illustrates a first surface of a coil substrate according to an embodiment of the present invention.
Figure 2B:
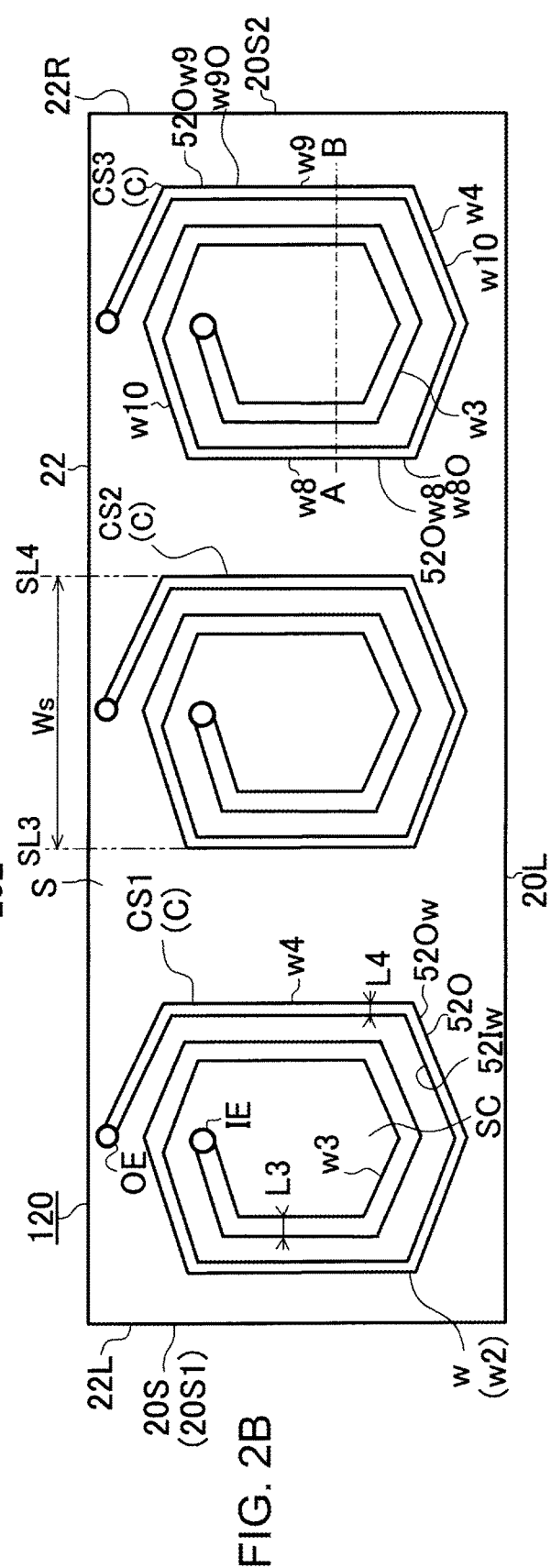
FIG. 2B illustrates a second surface of a coil substrate according to an embodiment of the present invention.

Embodiments will now be described with reference to the accompanying drawings, wherein like reference numerals designate corresponding or identical elements throughout the various drawings. FIGS. 2A and 2B illustrate an example of a coil substrate 120 of an embodiment.

The coil substrate 120 is formed of a flexible substrate 22, which has a first surface (F) and a second surface (S) on the opposite side with respect to the first surface (F), and multiple coils (C) formed on the flexible substrate 22. FIG. 2A illustrates the first surface (F) of the flexible substrate 22 and coils (C) formed on the first surface (F). The coils (C) on the first surface (F) are referred to as on-first-surface coils (CF). FIG. 2B illustrates the second surface (S) of the flexible substrate 22 and the coils (C) formed on the second surface (S). The coils (C) on the second surface (S) are referred to as on-second-surface coils (CS). By winding the coil substrate 120, a motor coil substrate 20 illustrated in FIG. 1B is obtained. The motor coil substrate 20 is wound around a hollow space (AH). For example, the motor coil substrate 20 has a tubular shape. The number of windings is 1 or more and 6 or less. FIG. 1B is a schematic diagram.

Figure 1A:
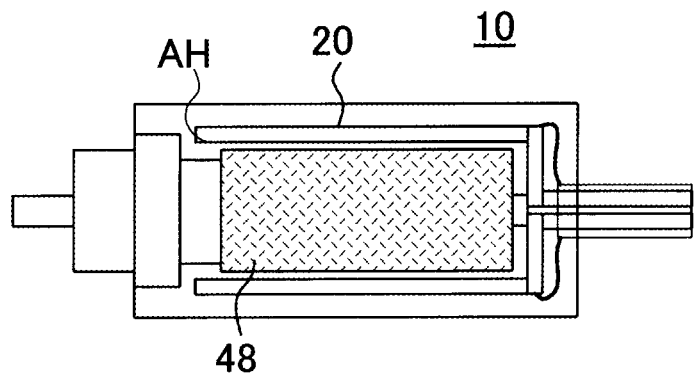
FIG. 1A is a schematic diagram of a motor according to an embodiment of the present invention.
Figure 1B:
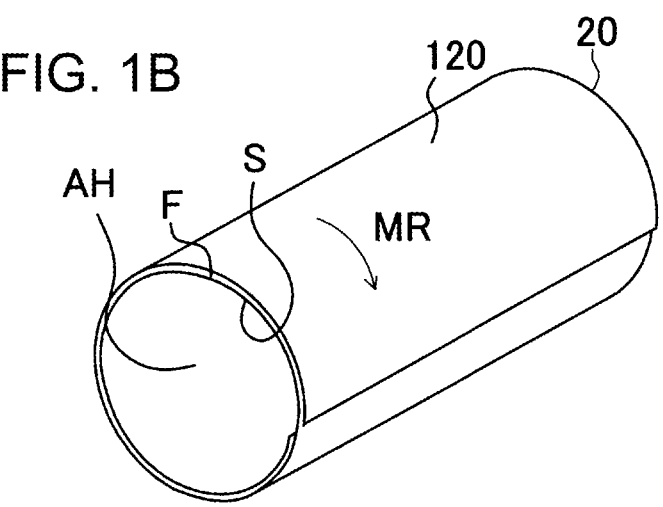
FIG. 1B is a schematic diagram of a motor coil substrate according to an embodiment of the present invention.

As illustrated in FIG. 1A, a motor 10 is obtained by positioning a magnet 48 inside the motor coil substrate 20. FIG. 1A is a schematic diagram. The motor coil substrate 20 is positioned around the magnet 48 via the hollow space (AH). An example of the motor 10 is a three-phase AC motor. In the embodiment, the magnet 48 rotates. However, it is also possible that the motor coil substrate 20 rotates. A rotation direction (MR) of the motor 10 is illustrated in FIG. 1B.

As illustrated in FIGS. 2A and 2B, the flexible substrate 22 has short sides (20S) and long sides (20L). The flexible substrate 22 has a rectangular planar shape. The flexible substrate 22 has one end (22L) and the other end (22R) on the opposite side with respect to the one end (22L). One of the short sides (20S) also serves as the one end (22L). The short side (20S) including the one end (22L) is a first side (20S1). The short side (20S) including the other end (22R) is a second side (20S2). The on-first-surface coils (CF) are formed along the long sides (20L) of the flexible substrate 22. The on-first-surface coils (CF) are formed in a row from the one end (22L) toward the other end (22R) of the flexible substrate 22. The on-first-surface coils (CF) are referred to as first coils. The number of the first coils (CF) is N.

In FIG. 2A, three first coils (CF) are drawn.

As illustrated in FIG. 2B, the on-second-surface coils (CS) are formed along the long sides (20L) of the flexible substrate 22. The on-second-surface coils (CS) are formed in a row from the one end (22L) toward the other end (22R) of the flexible substrate 22. The on-second-surface coils (CS) are referred to as second coils. The number of the second coils (CS) is N.

In FIG. 2B, three second coils (CS) are drawn.

The m-th second coil (CSm) is formed directly below the m-th first coil (CFm). The first coils (CF) and the second coils (CS) are substantially symmetrically formed via the flexible substrate 22. The number m is an integer equal to or larger than 1 and less than or equal to N.

The multiple coils (C) formed on the flexible substrate 22 are simultaneously formed. For example, the multiple coils (C) are formed on the flexible substrate 22 using a common alignment mark. Therefore, positions of the coils (C) are related to each other.

FIGS. 2A and 2B illustrate examples of the coils (C). Each coil (C) is formed of a center space (SC) and a wiring (w) surrounding the center space (SC). And, the wiring (w) has an outer end (OE) and an inner end (IF). The wiring (w) is formed between the outer end (OE) and the inner end (IF). The wiring (w) forming the coil (C) is formed in a spiral shape.

The first coils (CF) and the second coils (CS) are connected to each other by through-hole conductors penetrating the flexible substrate 22. The through-hole conductors each connect to each other the inner end (IE) of a first coil (CF) and the inner end (IE) of a second coil (CS). A current flows from a first coil (CF) to a second coil (CS) via a through-hole conductor. Or, a current flows from a second coil (CS) to a first coil (CF) via a through-hole conductor. A direction of a current flowing through a first coil (CF) and a direction of a current flowing through a second coil (CS) are the same.

A wiring (w) forming a first coil (CF) is a first wiring (w1). Of the first wiring (w1), a first wiring (w1) that forms an outermost turn is an outermost first wiring (51O). The first wiring (w1) has a first inner wall (51Iw), which is close the center space (SC), and a first outer wall (51Ow), which is on the opposite side with respect to the first inner wall (51Iw).

A wiring (w) forming a second coil (CS) is a second wiring (w2). Of the second wiring (w2), a second wiring (w2) that forms an outermost turn is an outermost second wiring (52O). The second wiring (w2) has a second inner wall (52Iw), which is close the center space (SC), and a second outer wall (52Ow), which is on the opposite side with respect to the second inner wall (52Iw).

The wiring (first wiring) (w1) of each first coil (CF) has a width (first width) (L1). The first width (LI) is substantially constant from the outer end (OE) to the inner end (IE).

The wiring (second wiring) (w2) of each second coil (CS) has a width (second width) (L3, L4). The second width (L3, L4) is not constant from the outer end (OE) to the inner end (IE).

FIG. 2B is a first example of the second coils (CS), and FIG. IC is a second example of the second coils (CS). In the first example and the second example, the second wiring (w2) is formed of a third wiring (w3) extending from the inner end (IE) and a fourth wiring (w4) extending from the third wiring (w3) to the outer end (OE). The third wiring (w3) has a width (third width) (L3), and the fourth wiring (w4) has a width (fourth width) (L4). The third width (L3) and the fourth width (L4) are different from each other.

In the first example, the third width (L3) is larger than the fourth width (L4). In the second example, the fourth width (L4) is larger than the third width (L3).

The number of turns of each of the first coils (CF) (the first number of turns) (K1) and the number of turns of each of the second coils (CS) (the second number of turns) (K2) are different from each other. The first number of turns (K1) is larger than the second number of turns (K2).

The number of turns (K1) of the m-th first coil (CF) and the number of turns (K2) of the m-th second coil (CS) are different from each other. Further, the first width (L1) is constant, and the second width (L3, L4) is not constant. Therefore, even when the m-th second coil (CS) is positioned directly below the m-th first coil (CF), the m-th second coil (CS) and the m-th first coil (CF) do not completely overlap each other. A space between first wirings (w1) that form adjacent turns and a space between second wirings (w2) that form adjacent turns do not completely overlap each other. A second wiring (w2) is positioned directly below a space between first wirings (w1) that form adjacent turns. According to the embodiment, undulation of the coil substrate 120 can be reduced.

The first coils (CF) each have a width (first coil width) (Wf). The second coils (CS) each have a width (second coil width) (Ws). The first coil width (Wf) and the second coil width (Ws) are substantially equal to each other.

A first straight line (SL1) and a second straight line (SL2) are prepared. The first straight line (SL1) and the second straight line (SL2) are parallel to each other. The first straight line (SL1) and the first side (20S1) are parallel to each other. The first coils (CF) are each sandwiched between the first straight line (SL1) and the second straight line (SL2) such that a distance between the first straight line (SL1) and the second straight line (SL2) is maximized. The distance between the first straight line (SL1) and the second straight line (SL2) is the width (Wf) of each of the first coils (CF).

A third straight line (SL3) and a fourth straight line (SL4) are prepared. The third straight line (SL3) and the fourth straight line (SL4) are parallel to each other. The third straight line (SL3) and the first side (20S1) are parallel to each other. The second coils (CS) are each sandwiched between the third straight line (SL3) and the fourth straight line (SL4) such that a distance between the third straight line (SL3) and the fourth straight line (SL4) is maximized. The distance between the third straight line (SL3) and the fourth straight line (SL4) is the width (Ws) of each of the second coils (CS).

The width (Wf) of each of the first coils (CF) and the width (Ws) of each of the second coils (CS) are substantially equal to each other.

The motor coil substrate 20 is manufactured by winding the coil substrate 120 illustrated in FIGS. 2A and 2B. Then, when the magnet 48 is accommodated inside the motor coil substrate 20, the motor 10 is manufactured.

The first straight line (SL1) and the second straight line (SL2) in FIG. 2A are parallel to each other. The first coils (CF) are each sandwiched between the first straight line (SL1) and the second straight line (SL2). The first coils (CF) are each sandwiched between the first straight line (SL1) and the second straight line (SL2) such that the distance between the first straight line (SL1) and the second straight line (SL2) is maximized. An angle between the first straight line (SL1) and the rotation direction (MR) of the motor is substantially 90 degrees. The distance between the first straight line (SL1) and the second straight line (SL2) is the width (Wf) of each of the first coils (CF).

The third straight line (SL3) and the fourth straight line (SL4) in FIG. 2B are parallel to each other. The second coils (CS) are each sandwiched between the third straight line (SL3) and the fourth straight line (SL4). The second coils (CS) are each sandwiched between the third straight line (SL3) and the fourth straight line (SL4) such that a distance between the third straight line (SL3) and the fourth straight line (SL4) is maximized. An angle between the third straight line (SL3) and the rotation direction (MR) of the motor is substantially 90 degrees. The distance between the third straight line (SL3) and the fourth straight line (SL4) is the width (Ws) of each of the second coils (CS).

When a ratio (Wf/Ws) of the width (WO of each of the first coils (CF) to the width (Ws) of each of the second coils (CS) is 0.95 or more and 1.05 or less, the width (Wf) of each of the first coils (CF) and the width (Ws) of each of the second coils (CS) are equal to each other.

When the first coils (CF) are projected onto the second surface (S) with light perpendicular to the first surface (F), the first outer wall (51Ow) of the outermost first wiring (51O) and the second outer wall (52Ow) of the outermost second wiring (52O) substantially overlap each other. The first coils (CF) are projected onto the second surface (S) with light perpendicular to the first surface (F). Then, on the second surface (S), a distance (R) between the first outer wall (51Ow) of the outermost first wiring (51O) and the second outer wall (52Ow) of the outermost second wiring (52O) is measured. The distance (R) is illustrated in FIG. 1D. When the distance (R) is 15 mm or less, the two substantially overlap each other. The first coils (CF) and the second coils (CS) substantially overlap each other.

Even when the first coils (CF) and the second coils (CS) substantially overlap each other, undulation of the coil substrate 120 can be reduced. Even when the width (Wf) of each of the first coils (CF) and the width (Ws) of each of the second coils (CS) are substantially equal to each other, the undulation of the coil substrate 120 can be reduced. Since the coil substrate 120 includes the second coils (CS), resistance of the coils (C) can be reduced. Loss can be reduced. A highly efficient motor can be provided.

In the embodiment, the second coils (CS) are respectively directly positioned below the first coils (CF). Therefore, when the first coils (CO and the second coils (CS) are observed from above the first surface (F), the wirings (w1, w2) of the two overlap each other. There are overlapping regions. In the overlapping regions, the first wiring (w1) and the second wiring (w2) overlap each other. In the embodiment, the first number of turns (K1) and the second number of turns (K2) are different from each other. Therefore, when the width (L1) of the first wiring (w1) and the width (L3, L4) of the second wiring (w2) are equal to each other, the overlapping regions are small. However, in the embodiment, the second wiring (w2) includes a wiring thicker than the first wiring (w1). Therefore, according to the embodiment, the overlapping regions can be increased. A space factor can be increased. A coil substrate 120 having high efficiency can be provided.

Figure 3A:
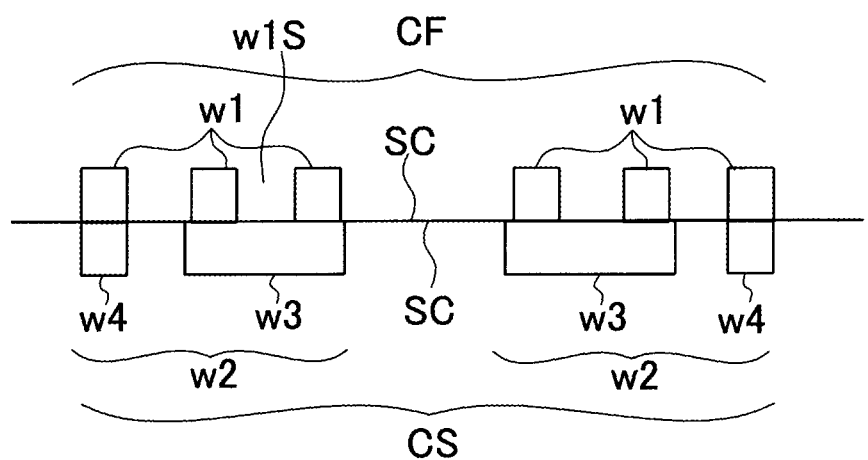
FIGS. 3A and 3B are cross-sectional views of a coil substrate according to an embodiment of the present invention.

FIG. 3A illustrates a partial cross section of coil substrate 120. FIG. 3A illustrates a cross section between a point (A) and a point (B) in FIGS. 2A and 2B. In FIG. 3A, a first coil (CF) and a second coil (CS) positioned directly below the first coil (CF) are drawn. In FIG. 3A, cross sections of the wirings (w1, w2) of the turns are drawn. In the example of FIG. 3A, the third width (L3) is larger than the fourth width (L4). As illustrated in FIG. 3A, the first wiring (w1) in different turns is positioned on the third wiring (w3) in one turn. The first wiring (w1) in one turn is positioned on the fourth wiring (w4) in one turn. In FIG. 3A, the first wiring (w1) in two turns is positioned on the third wiring (w3) in one turn. The third wiring (w3) is positioned below a space (w1 5) between adjacent turns.

Figure 1C:
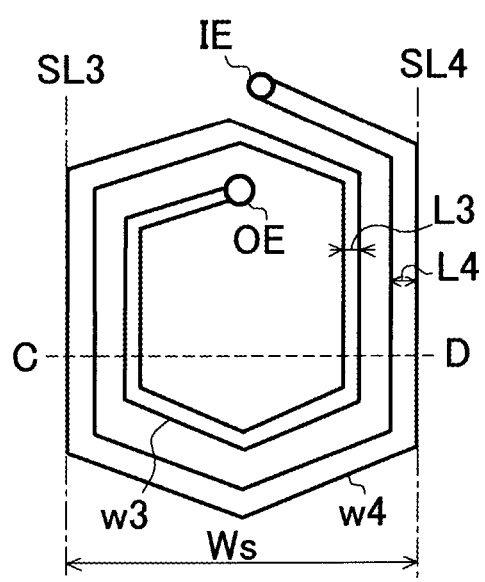
FIG. 1C illustrates a second example of a second coil according to an embodiment of the present invention.
Figure 1D:
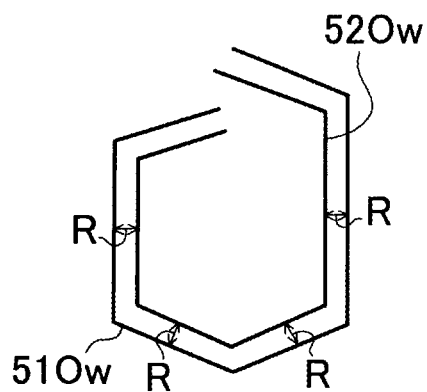
FIG. 1D illustrates a distance (R) according to an embodiment of the present invention.
Figure 3B:
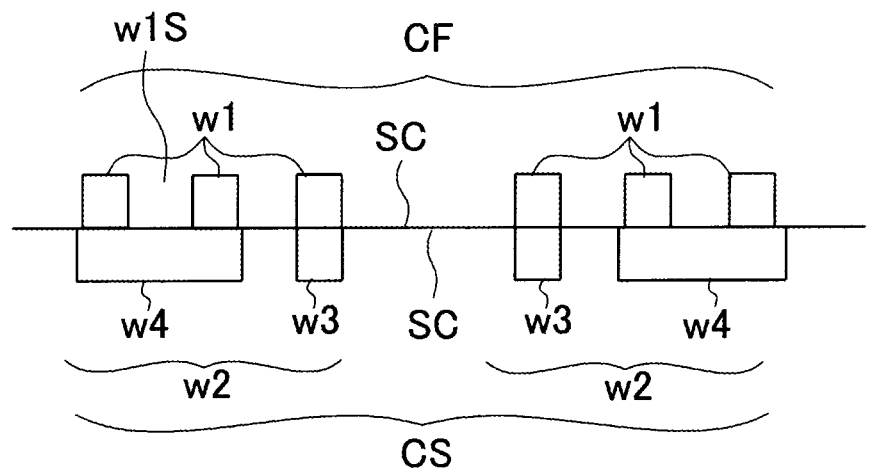

FIG. 3B illustrates a cross section between a point (C) and a point (D) in FIG. 1C. As illustrated in FIG. 3B, when the fourth width (L4) is larger than the third width (L3), the first wiring (w1) in different turns is positioned on the fourth wiring (w4) in one turn. The first wiring (w1) in one turn is positioned on the third wiring (w3) in one turn. In FIG. 3B, the first wiring (w1) in two turns is positioned on the fourth wiring (w4) in one turn. The fourth wiring (w4) is positioned below the space (w1S) between adjacent turns. In this way, even when the first number of turns (K1) and the second number of turns (K2) are different from each other, multiple turns in a first coil (CF) are positioned on one turn in a second coil (CS). Therefore, when the motor 10 is manufactured using the coil substrate 120 including the first coils (CF) and the second coils (CS), a highly efficient motor 10 can be obtained. A torque of the motor 10 can be increased.

The first coils (CF) illustrated in FIG. 2A each have a substantially hexagonal planar shape. In the example of FIG. 2A, the number of turns (K1) of each of the first coils (CF) is 3. One turn of each of the first coils (CF) of FIG. 2A is divided into one fifth wiring (w5), one sixth wiring (w6), and two seventh wirings (w7). The fifth wiring (w5) and the sixth wiring (w6) face each other via the center space (SC). Among the fifth wiring (w5) and the sixth wiring (w6), the fifth wiring (w5) is close to the one end (22L). The fifth wiring (w5) and the sixth wiring (w6) extend straight. The seventh wirings (w7) connect the fifth wiring (w5) and the sixth wiring (w6). The seventh wirings (w7) are bent. A width of the fifth wiring (w5), a width of the sixth wiring (w6), and a width of each of the seventh wirings (w7) are substantially equal to each other. In one turn, the fifth wiring (w5), the sixth wiring(w6), and the seventh wirings (w7) are formed in an order of the fifth wiring (w5), the seventh wiring (lower side seventh wiring) (w7), the sixth wiring (w6), and the seventh wiring (upper side seventh wiring) (w7). The fifth wiring (w5) and the sixth wiring (w6) are substantially parallel to each other. The fifth wirings (w5) formed in the turns are substantially parallel to each other. The sixth wirings (w6) formed in the turns are substantially parallel to each other. The fifth wirings (w5) and the first side (20S1) are substantially parallel to each other. When the motor 10 is manufactured using the coil substrate 120 of the embodiment, an angle between the rotation direction (MR) of the motor illustrated in FIG. 1B and the fifth wirings (w5) is substantially 90 degrees. An angle between a direction of a current flowing through the fifth wirings (w5) and the rotation direction (MR) of the motor is substantially 90 degrees.

The first straight line (SL1) and the second straight line (SL2) are drawn in FIG. 2A. The distance between the first straight line (SL1) and the second straight line (SL2) is the width (Wf) of each of the first coils (CF). The first straight line (SL1) and the first side (20S1) are parallel to each other. The fifth wirings (w5) and the first side (20S1) are parallel to each other.

The fifth wiring (w5) that forms the outermost first wiring (51O) is an outermost fifth wiring (w5O). The outermost fifth wiring (w5O) has a first outer wall (outermost fifth wiring's first outer wall) (51Ow5).

The sixth wiring (w6) that forms the outermost first wiring (51O) is an outermost sixth wiring (w6O). The outermost sixth wiring (w6O) has a first outer wall (outermost sixth wiring's first outer wall) (51Ow6).

The first coils (CF) in FIG. 2A are each sandwiched between the first straight line (SLI) and the second straight line (SL2). The first straight line (SL1) contains the outermost fifth wiring's first outer wall (51Ow5). The second straight line (SL2) contains the outermost sixth wiring's first outer wall (51Ow6). The width (Wf) of each of the first coils (CF) illustrated in FIG. 2A is a distance between the outermost fifth wiring's first outer wall (51Ow5) and the outermost sixth wiring's first outer wall (51Ow6).

The second coils (CS) illustrated in FIG. 2B each have a substantially hexagonal planar shape. In the example of FIG. 2B, the number of turns (K2) of each of the second coils (CS) is 2. One turn of each of the second coils (CS) of FIG. 2B is divided into one eighth wiring (w8), one ninth wiring (w9), and two tenth wirings (w1O). The eighth wiring (w8)

and the ninth wiring (w9) face each other via the center space (SC). Among the eighth wiring (w8) and the ninth wiring (w9), the eighth wiring (w8) is close to one end (22L). The eighth wiring (w8) and the ninth wiring (w9) extend straight. The tenth wirings (w10) connect the eighth wiring (w8) and the ninth wiring (w9). The tenth wirings (w10) are bent. As illustrated in FIG. 2B, the width of the second wiring (w2) is different for each turn. In each of the second coils (CS) of the embodiment, the width of the second wiring in one turn is constant. The eighth wiring (w8), the ninth wiring (w9), and the tenth wirings (w10) are formed in an order of the eighth wiring (w8), the tenth wiring (lower side tenth wiring) (w10), the ninth wiring (w9), and the tenth wiring (upper side tenth wiring) (w10). The eighth wiring (w8) and the ninth wiring (w9) are substantially parallel to each other. The eighth wirings (w8) formed in the turns are substantially parallel to each other. The ninth wirings (w9) formed in the turns are substantially parallel to each other. The eighth wirings (w8) and the first side (20S1) are substantially parallel to each other. When the motor 10 is manufactured using the coil substrate 120 of the embodiment, an angle between the rotation direction (MR) of the motor illustrated in FIG. 1B and the eighth wirings (w8) is substantially 90 degrees. An angle between a direction of a current flowing through the eighth wirings (w8) and the rotation direction (MR) of the motor is substantially 90 degrees.

The third straight line (SL3) and the fourth straight line (SL4) are drawn in FIG. 2B. The distance between the third straight line (SL3) and the fourth straight line (SL4) is the width (Ws) of each of the second coils (CS). The third straight line (SL3) and the first side (20S1) are parallel to each other. The eighth wirings (w8) and the first side (20S1) are parallel to each other.

The eighth wiring (w8) that forms the outermost second wiring (52O) is an outermost eighth wiring (w8O). The outermost eighth wiring (w8O) has a first outer wall (outermost eighth wiring's first outer wall) (52Ow8).

The ninth wiring (w9) that forms the outermost second wiring (52O) is an outermost ninth wiring (w9O). The outermost ninth wiring (w9O) has a first outer wall (outermost ninth wiring's first outer wall) (52Ow9).

The second coils (CS) in FIG. 2B are each sandwiched between the third straight line (SL3) and the fourth straight line (SL4). The third straight line (SL3) contains the outermost eighth wiring's first outer wall (52Ow8). The fourth straight line (SL4) contains the outermost ninth wiring's first outer wall (52Ow9). The width of each of the second coils (CS) illustrated in FIG. 2B is a distance between the outermost eighth wiring's first outer wall (52Ow8) and the outermost ninth wiring's first outer wall (52Ow9).

The width (Wf) of each of the first coils (CF) illustrated in FIG. 2A and the width (Ws) of each of the second coils (CS) illustrated in FIG. 2B are equal to each other.

According to the coil substrate 120 of the embodiment, the width (L1) of the first wiring (w1) is constant. The width (L3, L4) of the second wiring (w2) is not constant. The second wiring (w2) is formed by connecting a wiring having the same width as the first wiring (w1) and a wiring having a width larger than that of the first wiring (w1). A thicker wiring has a lower resistance. Therefore, when the coils (C) of the embodiment are used for the coil substrate 120, loss can be reduced. When the coils (C) of the embodiment are used for the motor coil substrate 20, the efficiency of the motor can be increased. When the first number of turns (K1) and the second number of turns (K2) are different from each other, the second wiring (w2) is formed by connecting the wirings (w3, w4) having different widths. Low resistance coils (C) can be provided. A coil substrate 120 having a high space factor can be provided. A motor 10 having high efficiency can be provided.

The coils (C) in FIGS. 2A and 2B include U-phase coils, V-phase coils, and W-phase coils. The U-phase coils, the V-phase coils, and the W-phase coils are formed in an order of the U-phase coils, the V-phase coils, and the W-phase coils. The coils (C) closest to the one end (22L) are the U-phase coils (CU). The coil substrate 120 illustrated in FIGS. 2A and 2B is a coil substrate 120 to be used in a three-phase motor.

In a modified embodiment of Japanese Patent Application Laid-Open Publication No. 2020-38865, coils are formed on a first surface and a second surface of a flexible substrate. A coil on the first surface is an upper coil and a coil on the second surface is a lower coil. Then, when the lower coil is projected onto the first surface with light perpendicular to the first surface, the upper coil and the lower coil substantially overlap each other. Therefore, in the modified embodiment of Japanese Patent Application Laid-Open Publication No. 2020-38865, it is considered that the number of turns of the upper coil and the number of turns of the lower coil are the same. It is considered that a wiring width of the upper coil and a wiring width of the lower coil are equal to each other. Therefore, it is considered that wirings of the upper coil and wirings of the lower coil overlap each other. Further, it is considered that a space between the wirings forming the upper coil and a space between the wirings forming the lower coil overlap each other. Therefore, it is considered that, in the modified embodiment of Japanese Patent Application Laid-Open Publication No. 2020-38865, high-strength portions and low-strength portions are alternately formed. As a result, it is considered that a motor coil substrate of the modified embodiment of Japanese Patent Application Laid-Open Publication No. 2020-38865 has a large undulation.

A coil substrate according to an embodiment of the present invention includes: a flexible substrate that has a first surface and a second surface on the opposite side with respect to the first surface, and has one end and the other end on the opposite side with respect to the one end; an on-first-surface coil that is formed on the first surface of the flexible substrate; and an on-second-surface coil that is formed on the second surface of the flexible substrate. The on-second-surface coil is positioned directly below the on-first-surface coil. The on-first-surface coil and the on-second-surface coil are each formed of a center space and a wiring surrounding the center space. The wiring has an outer end and an inner end. The wiring is formed in a spiral shape between the outer end and the inner end. The number of turns (first number of turns) of the on-first-surface coil is larger than the number of turns (second number of turns) of the on-second-surface coil. A width (first width) of the wiring (first wiring) forming the on-first-surface coil is substantially constant from the outer end to the inner end. A width (second width) of the wiring (second wiring) forming the on-second-surface coil is not constant from the outer end to the inner end.

In a coil substrate according to an embodiment of the present invention, the number of turns of the wiring (first wiring) forming the on-first-surface coil is larger than the number of turns of the wiring (second wiring) forming the on-second-surface coil. Further, the width (first width) of the first wiring is substantially constant, and the width (second width) of the second wiring is not constant. Therefore, in the embodiment, the on-first-surface coil and the on-second-surface coil do not completely overlap each other. Therefore, when the technology of the embodiment is used, undulation of a coil substrate can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A coil substrate, comprising:
    a flexible substrate having a first end and a second end on an opposite side with respect to the first end;
    a first coil formed on a first surface of the flexible substrate such that the first coil has a center space and a first wiring surrounding the center space; and
    an second coil formed on a second surface of the flexible substrate on an opposite side with respect to the first surface such that the second coil has a center space and a second wiring surrounding the center space and is positioned directly below the first coil,
    wherein each of the first and second wirings of the first and second coils has an outer end and an inner end such that each of the first and second wirings is formed in a spiral shape between the outer end and the inner end, the first coil is formed such that a number of turns in the first coil is greater than a number of turns in the second coil and that a width of the first wiring forming the first coil is substantially constant from the outer end to the inner end, and the second coil is formed such that a width of the second wiring forming the second coil is not constant from the outer end to the inner end.

2. The coil substrate according to claim 1, wherein the second coil is formed such that the second wiring includes a third wiring extending from the inner end and a fourth wiring extending from the third wiring to the outer end.

3. The coil substrate according to claim 2, wherein the second wiring of the second coil is formed such that a width of the fourth wiring is greater than a width of the third wiring.

4. The coil substrate according to claim 3, wherein the second wiring of the second coil is formed such that the width of the third wiring is formed substantially equal to the width of the first wiring in the first coil.

5. The coil substrate according to claim 2, wherein the second wiring of the second coil is formed such that a width of the third wiring is greater than a width of the fourth wiring.

6. The coil substrate according to claim 5, wherein the second wiring of the second coil is formed such that the width of the fourth wiring is formed substantially equal to the width of the first wiring in the first coil.

7. The coil substrate according to claim 1, further comprising:
    a through-hole conductor penetrating through the flexible substrate such that the through-hole conductor is connecting the first coil and the second coil.

8. The coil substrate according to claim 7, wherein the through-hole conductor is formed such that the through-hole conductor is connecting the inner end of the first wiring in the first coil and the inner end of the second wiring in the second coil.

9. The coil substrate according to claim 1, wherein the second wiring of the second coil is formed such that a coil width of the second coil is substantially equal to a coil width of the first coil.

10. The coil substrate according to claim 1 wherein the first coil is formed such that the first wiring has a first inner wall and a first outer wall on an opposite side with respect to the first inner wall and that the first wiring includes an outermost first wiring forming an outermost turn, the second coil is formed such that the second wiring has a second inner wall and a second outer wall on an opposite side with respect to the second inner wall, that the second wiring includes an outermost second wiring forming an outermost turn, and that the second outer wall of the outermost second wiring is in a position substantially overlapping with the first outer wall of the outermost first wiring.

11. The coil substrate according to claim 9, wherein the flexible substrate has a first side including the first end and a second side including the second end, the first coil is formed such that the coil width of the first coil is a distance between a first straight line and a second straight line parallel to the first straight line and that the first straight line is substantially parallel to the first side of the flexible substrate, the first coil is sandwiched between the first straight line and the second straight line such that the coil width of the first coil is maximized, the second coil is formed such that the coil width of the second coil is a distance between a third straight line and a fourth straight line parallel to the third straight line and that the third straight line is substantially parallel to the first side, and the second coil is sandwiched between the third straight line and the fourth straight line such that the coil width of the second coil is maximized.

12. A motor coil substrate, comprising:
    the coil substrate of claim 1 wound in a tubular shape such that the coil substrate is forming a hollow space configured to accommodate a magnet.

13. A motor, comprising:
    the motor coil substrate of claim 12; and
    a magnet positioned inside the hollow space of the motor coil substrate.

14. A motor coil substrate, comprising: the coil substrate of claim 9 wound in a tubular shape such that the coil substrate is forming a hollow space configured to accommodate a magnet.

15. The motor coil substrate according to claim 14, wherein the first coil is formed such that the coil width of the first coil is a distance between a first straight line and a second straight line parallel to the first straight line and that an angle between the first straight line and a rotation direction of a motor is set substantially 90 degrees when the magnet is positioned in the hollow space of the motor coil substrate and a motor comprising the motor coil substrate and the magnet is formed, the first coil is sandwiched between the first straight line and the second straight line such that the coil width of the first coil is maximized, the second coil is formed such that the coil width is a distance between a third straight line and a fourth straight line parallel to the third straight line and that an angle between the third straight line and the rotation direction of the motor is substantially 90 degrees when the magnet is positioned in the hollow space of the motor coil substrate and the is formed, and the second coil is sandwiched between the third straight line and the fourth straight line such that the coil width of the second coil is maximized.

16. The coil substrate according to claim 2, further comprising:
    a through-hole conductor penetrating through the flexible substrate such that the through-hole conductor is connecting the first coil and the second coil.

17. The coil substrate according to claim 16, wherein the through-hole conductor is formed such that the through-hole conductor is connecting the inner end of the first wiring in the first coil and the inner end of the second wiring in the second coil.

18. The coil substrate according to claim 2, wherein the second wiring of the second coil is formed such that a coil width of the second coil is substantially equal to a coil width of the first coil.

19. The coil substrate according to claim 2, wherein the first coil is formed such that the first wiring has a first inner wall and a first outer wall on an opposite side with respect to the first inner wall and that the first wiring includes an outermost first wiring forming an outermost turn, the second coil is formed such that the second wiring has a second inner wall and a second outer wall on an opposite side with respect to the second inner wall, that the second wiring includes an outermost second wiring forming an outermost turn, and that the second outer wall of the outermost second wiring is in a position substantially overlapping with the first outer wall of the outermost first wiring.

20. The coil substrate according to claim 19, wherein the flexible substrate has a first side including the first end and a second side including the second end, the first coil is formed such that the coil width of the first coil is a distance between a first straight line and a second straight line parallel to the first straight line and that the first straight line is substantially parallel to the first side of the flexible substrate, the first coil is sandwiched between the first straight line and the second straight line such that the coil width of the first coil is maximized, the second coil is formed such that the coil width of the second coil is a distance between a third straight line and a fourth straight line parallel to the third straight line and that the third straight line is substantially parallel to the first side, and the second coil is sandwiched between the third straight line and the fourth straight line such that the coil width of the second coil is maximized.

* * * * *